//www.example.com
United States Patent [19]

Foster et al.

[11] Patent Number: 4,823,225

[45] Date of Patent: Apr. 18, 1989

[54] BIPOLAR IMMERSION DETECTION CIRCUIT INTERRUPTER

[75] Inventors: Robert W. Foster, Hinsdale; Donald J. Kempiak, Palatine, both of Ill.

[73] Assignee: Associated Mills Inc., Chicago, Ill.

[21] Appl. No.: 141,928

[22] Filed: Jan. 6, 1988

Related U.S. Application Data

[63] Continuation-in-part of Ser. No. 86,904, Aug. 18, 1987, abandoned.

[51] Int. Cl.⁴ ............................................. H02H 3/16
[52] U.S. Cl. ...................................... 361/42; 361/50; 340/650
[58] Field of Search ............................ 361/42, 48–50, 361/103, 104, 115, 178; 307/116, 118, 130; 340/604, 605, 650

[56] References Cited

U.S. PATENT DOCUMENTS

| | | | |
|---|---|---|---|
| 3,277,407 | 10/1966 | Kobayashi | 335/18 |
| 3,493,815 | 2/1970 | Hurtle | 361/55 |
| 3,558,988 | 1/1971 | Ellenberger | 317/33 |
| 3,813,579 | 5/1974 | Doyle et al. | 361/48 |
| 4,001,647 | 1/1977 | Klein et al. | 317/18 |
| 4,270,158 | 5/1981 | Gilardoni et al. | 361/42 |
| 4,282,500 | 8/1981 | Ducroquet et al. | 335/18 |
| 4,412,193 | 10/1983 | Bienwald et al. | 335/18 |
| 4,464,582 | 8/1984 | Aragaki et al. | 307/118 |
| 4,568,997 | 4/1986 | Bienwald et al. | 361/45 |
| 4,589,047 | 5/1986 | Gaus et al. | 361/42 |
| 4,595,894 | 6/1986 | Doyle et al. | 335/18 |
| 4,751,603 | 6/1988 | Kwan | 361/4 L |

FOREIGN PATENT DOCUMENTS

1213665 11/1986 Canada .
1218445 2/1987 Canada .

Primary Examiner—Roy N. Envall, Jr.
Assistant Examiner—Todd E. DeBoer
Attorney, Agent, or Firm—Laff, Whitesel, Conte & Saret

[57] ABSTRACT

An immersion detector comprises a pair of spring biased circuit breaking contacts for removing power from an appliance. The appliance has a sensing circuit which may become energized if it is dropped into a body of an electrically conductive liquid, such as a sink full of water. An SCR is connected to each side of the line and is triggered by an energization of said sensing circuit so that it is irrelevant which side of the line is hot and which side is at neutral. When either SCR conducts, a solenoid releases the spring bias which causes the circuit breaking contacts to fly apart.

17 Claims, 3 Drawing Sheets

BIPOLAR IMMERSION DETECTION CIRCUIT INTERRUPTER

This is a continuation-in-part of Ser. No. 07/086,904, filed Aug. 18, 1987, now abandoned.

This invention relates to detectors of extraneous ground potentials and more particularly to immersion detection circuits for cutting off the supply of power to an appliance which is dropped into a body of water, such as a sink or tub filled with water, or the like.

The term "immersion detection circuit interrupter" refers to a device which cuts off all electrical power to a device which has become immersed in water or another conductive fluid. The "immersion detection circuit" is not referenced to ground. Therefore the immersion detection circuit operation is triggered by any energization from a hot wire through water of a sensing point. Thus, it is irrelevant which side of the line is hot and which side is at neutral or whether the device is immersed in a body of water connected to or insulated from plumbing ground.

At the present time, the most common cause of electrocution is a hand held hair dryer which has been dropped into a sink filled with water. The user drops the hair dryer and instinctively tries to catch it before it strikes a potentially damage inflicting surface, such as the floor, a sink, or a counter top. The hair dryer falls into the water and the person trying to catch it puts a hand into the water, without any thought other than the reflexive grab for it. While the hand held hair dryer is currently the most dangerous single cause of electrocution, the same problem exists with all appliances and devices which may be used around water. This includes devices used out of doors such as electric lawn mowers, hedge trimmers, drills and the like.

Note that when the appliance is dropped into a bath tub filled with water, the body in the tub is subject to shock. This is very different from and much more dangerous than a finger touching a bare wire.

The primary protection for the user is built into a house as fuses, circuit breakers, and the like. However, recent trends have been to provide secondary devices for protecting the user, often at a point when the appliance is used.

These secondary ground fault detecting devices have been provided for detecting the kind of ground potential which occurs when an appliance is dropped into a sink full of water, for example. Insofar as is known, all of these devices have been designed under an assumption that the house is properly wired and that the sink or tub is connected to the plumbing ground, neither of which is always true. Sometimes there is a human error during the wiring of a house wherein a circuit is polarized incorrectly so that the neutral and hot leads are interchanged. If so, the ground fault detecting device does not "see" any potential difference if it is "looking" at the neutral wire instead of a hot wire which is supposed to be there, when it compares a fault (i.e. ground through a sink full of water) with a line potential. Or, if the sink is isolated from ground by means of plastic tubes or drains, there is no ground for these ground fault detectors to detect.

For these and similar reasons, there is a need for a bipolar immersion detector which reliably interrupts a supply of power to an appliance which has fallen into a body of water, and which does not require any reference to either the neutral of the electrical wiring or the plumbing ground provided by pipes, drains, etc.

Accordingly, an object of this invention is to provide new and improved grounding detectors, and more particularly, to immersion detection circuits for cutting off the power supplied to an appliance which is in water. Here an object is to so cut-off the power regardless of whether the house wiring has neutral or a hot wire on the proper or improper terminal. Another object is to detect such an immersion even if plastic plumbing, or the like, insulates the water where the immersion occurs from the normal ground to plumbing pipes.

In keeping with an aspect of the invention, these and other objects are accomplished by a double sided circuit having a pair of electronic switches, one switch extending from an immersion sensing connection point to each side of the A.C. line. Either one or the other of the switches is tripped responsive to a gating pulse which is applied to it when water reaches the sensing connection point of an appliance. Thus, according to the invention, it is irrelevant whether or not the line is correctly polarized with the proper side of the line at neutral while the other side of the line is hot. Diodes are provided for isolation and steering the switch operating circuits in order to isolate the primary energizing circuits of the two electronic switches from each other. This way, the firing and holding of one of the electronic switches is not affected by the existence of the other electronic switch.

A preferred embodiment of the invention is shown in the attached drawing, wherein.

Figure 1:
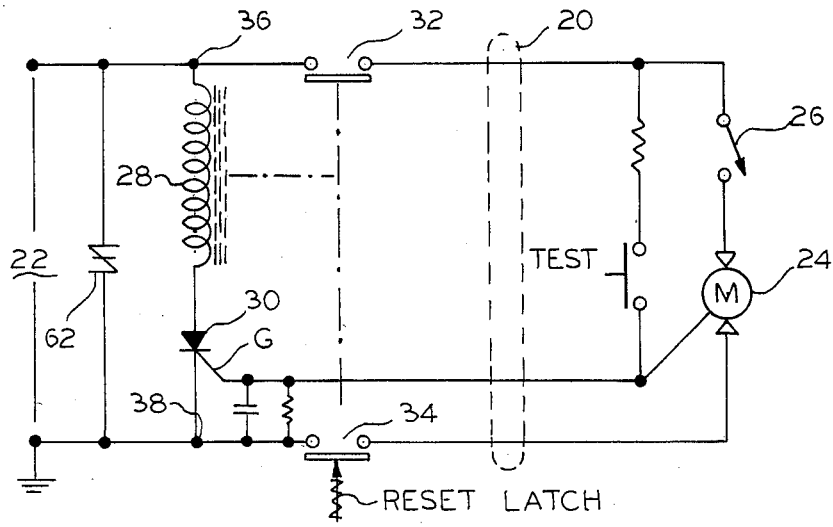
FIG. 1 is a schematic circuit diagram showing a prior art immersion detection circuit.

FIG. 1 shows a prior art appliance power cord 20 having a standard commercial power line 22 connected to one end and a motor 24 connected to the other end, with an on/off switch 26 coupled to energize the motor. A solenoid coil 28 is coupled across the line, in series with an electronic switch 30, here an SCR. The gate of the SCR 30 is connected to the housing, frame or another potential point on motor 24. Normally, this housing, frame, or potential point is insulated from the power line and thus has no potential thereon. However, if the motor 24 is dropped into a tub or sink, for example, which is full of water, a potential appears on the housing, frame or potential point of the motor, and therefore, on the gate G of SCR 30. The SCR switches on and energizes the solenoid 28. The solenoid operates a set of contacts 32, 34 which open the power cord and remove the A.C. source 22 from the line 20.

Note that the prior art SCR 30 is polarized so that, in the convention of current from plus to minus, the solenoid 28 is energized only when the upper end 36 of its coil is positive and the lower end is negative. Also, a firing pulse applied to the gate G of SCR 30 must have the proper polarity before the SCR 30 switches on. Accordingly, the assumption is that the house wiring 22 is properly polarized with the neutral or white wire connected to the terminal 38. If the house is improperly wired or if the wall plug of the appliance is reversed so that the neutral or white wire is connected at 36, and a hot wire is under water, but water does not reach the switch 26, and switch 26 is open, the potential appearing at G does not have the polarity which fires the SCR 30. If so, the electronic switch 30 is not operated. There may be other ways in which the circuit of FIG. 1 could malfunction.

Figure 2:
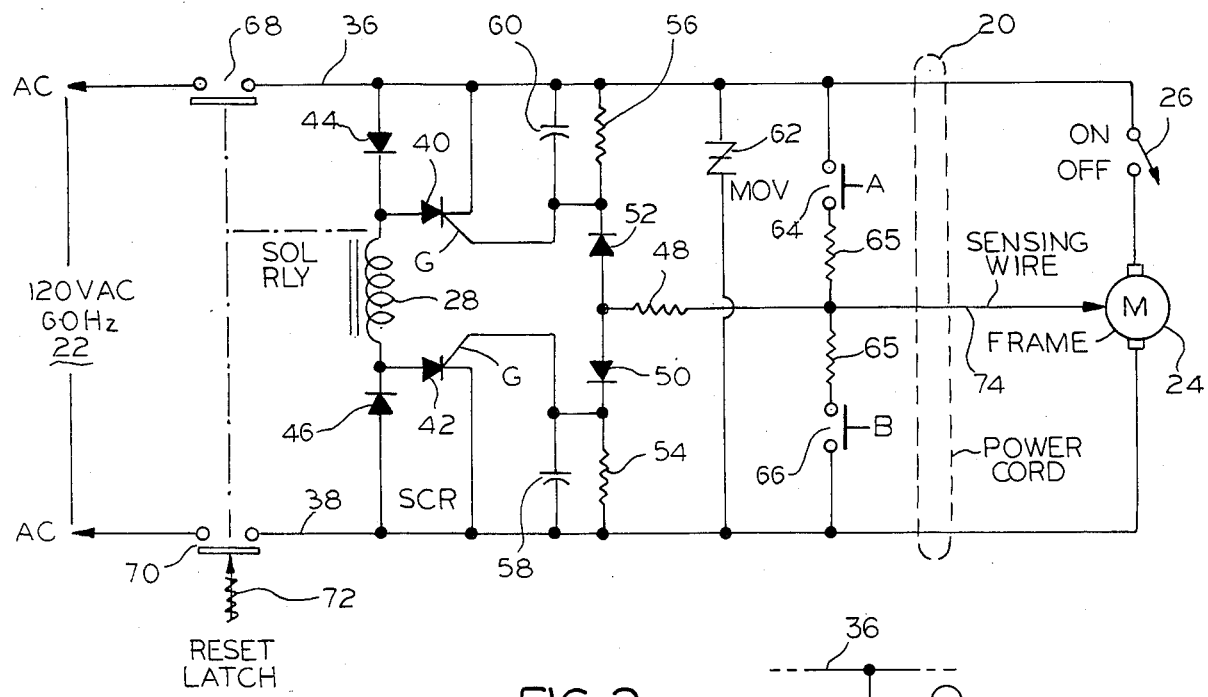
FIG. 2 is a schematic circuit diagram of the inventive circuit.

The inventive circuit of FIG. 2 interrupts power regardless of whether the house is wired properly or whether the plug is correctly inserted into a wall outlet, with proper polarity. The circuit of FIG. 2 does not depend upon the presence of a proper plumbing ground.

Again, the power cord 20 of FIG. 2 has A.C. power 22 on one end and a motor 24 on the other end, with an on/off switch at 26. Two oppositely poled electronic switches (here SCRs) 40, 42 are coupled to opposite sides 36, 38 of the power line 22, in order to insure that one switch is poled to conduct regardless of the proper or improper house wiring or plug orientation. The solenoid coil 28 is isolated between two oppositely poled, steering diodes 44, 46. From an inspection of FIG. 2, it is seen that there are two circuits for operating the solenoid, one circuit being from A.C. power line 36 through diode 44, solenoid coil 28, and SCR 42 to A.C. power line 38. The other solenoid operating circuit is from A.C. power line 38 through diode 46, solenoid coil 28 and SCR 40 to the A.C. power line 36.

The sensing or gating circuit 74 extends from any suitable sensing point through current limiting resistor 48 and either steering diode 50 to the gate G of SCR 42 or steering diode 52 to the gate G of SCR 40. The effective one of those circuits depends upon which one of the power line wires 36, 38 is hot and which is neutral. Depending upon the polarity and conductivity of steering diodes 50 or 52, the resistor 48 and one of the resistors 54 or 56 form a voltage divider for setting the voltage level of the firing pulse applied to an SCR gate electrode G. The voltage level of the firing pulse should have the lowest possible potential consistent with reliably firing an SCR.

The capacitors 58, 60 provide a high frequency bypass in order to prevent the SCR from firing in response to transients such as wild voltage spikes.

Voltage limiting means in the form of MOV 62 is connected across line 36, 38 to limit the voltage appearing across the SCR's 40, 42. A MOV is similar to two back to back zener diodes. At some maximum voltage, they conduct, thereby limiting the voltage of any wild spikes appearing on the line.

Two push-to-operate switches 64, 66 connect the sensing or gating circuit 74 to opposite sides of the line. An operation of these switches should turn on an SCR 44, 46 by simulating a fault. Thus, switches 64, 66 provide a test operations to insure that the circuit is in a proper working order.

In operation, the reset latch contacts are closed by pushing a spring loaded push button 72. The lines 36, 38 connect the motor 24 directly to the AC power source 22 via power cord 20. As long as there is no fault, the appliance operates as if the inventive circuit does not exist.

Assume that the motor 24 falls into a body of water which fills its housing, creating a short circuit from any source of potential which may be present to the frame. It is not important whether switch 26 is operated or unoperated. If any electrical potential is present in a body of water to an extent that a person could feel it, the sensing or gating circuit 74 also has a potential on it. Thus, a firing potential appears on sensing or gating circuit 74, and is applied to the SCR's 40, 42, gate electrodes via diodes 50, 52. If the wire 36 is hot and the wire 38 is at neutral potential, SCR 42 fires and a sustaining current flows from hot wire 36 through steering diode 44, solenoid 28, and SCR 42 to neutral. If the wire 38 is at neutral potential, SCR 42 fires and a sustaining current flows. If the wire 38 is hot, the short circuit to sensing or gating circuit 74 is applied through diode 52 to the gate of SCR 40, which fires. The solenoid 28 is energized over the path from wire 38 through diode 46, solenoid 28, and SCR 40 to neutral at wire 36.

In one embodiment, the components had approximately the following values:

The diodes 44, 46, 50, 52 may be any device which blocks the pertinent voltage in one polarity direction and conducts in the other direction.

Capacitors 58, 60 may be about 0.15 to 0.47 Fd, to provide a small delay to prevent a false firing of the SCRs from transients, while still firing them at a high speed to prevent shock hazards.

Resistors 54, 56 may be about 300-330 ohms.

Resistor 48 may be about 15-24 K ohms (Resistor 48 limits current on sensor wire 74 to about 7-10 milliamps).

Figure 3:
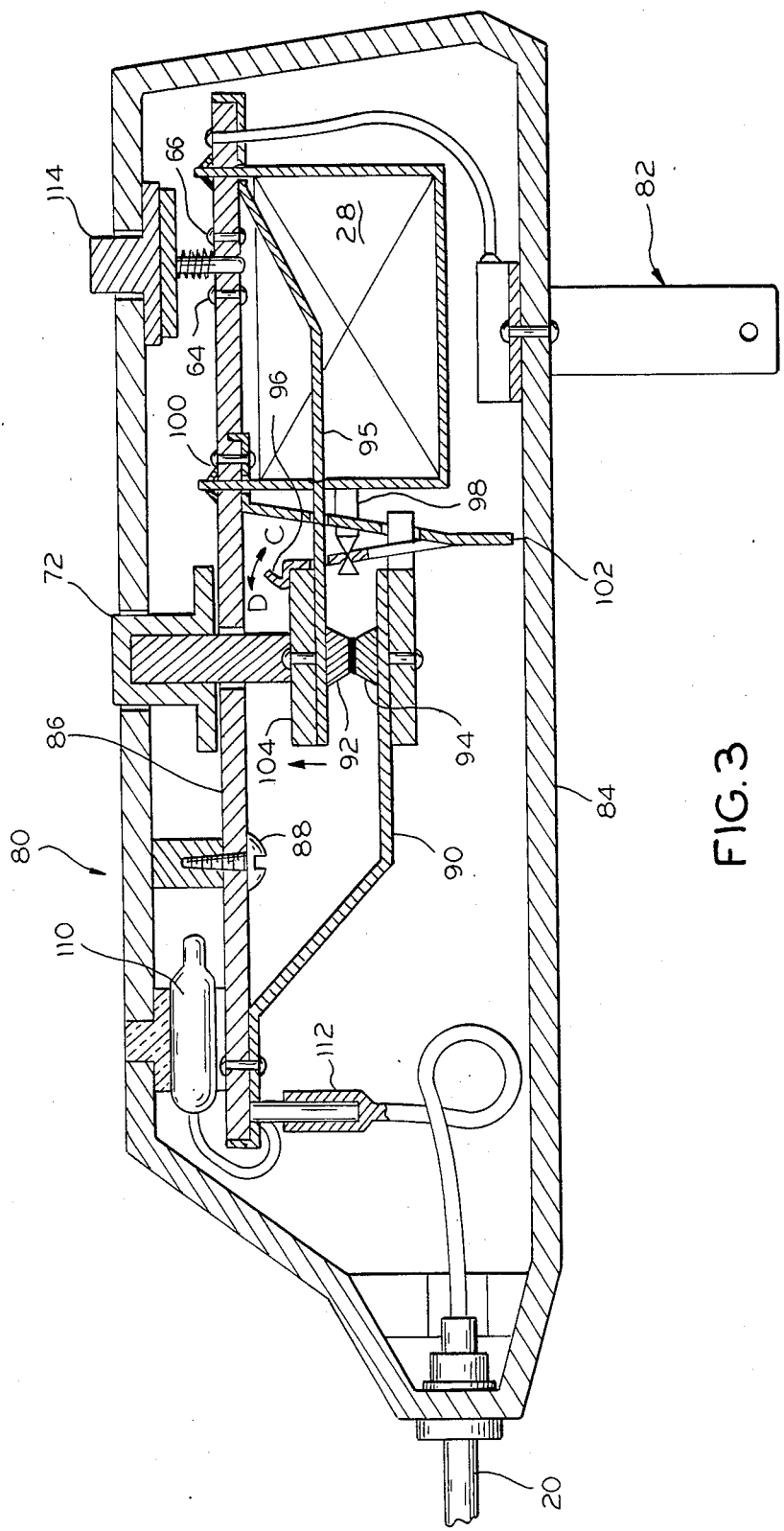
FIG. 3 is a cross sectional view of a mechanical housing having means for checking the circuit.

FIG. 3 shows the mechanical aspect of the invention as a power cord 20 leading from an appliance to a wall plug 80 having a pair of terminals 82 for plugging into a wall outlet, or the like. The plug 80 may be enclosed by a unitary molded rubber housing 84 or a two piece plastic housing which is held together by one or more bolts.

Figure 4:
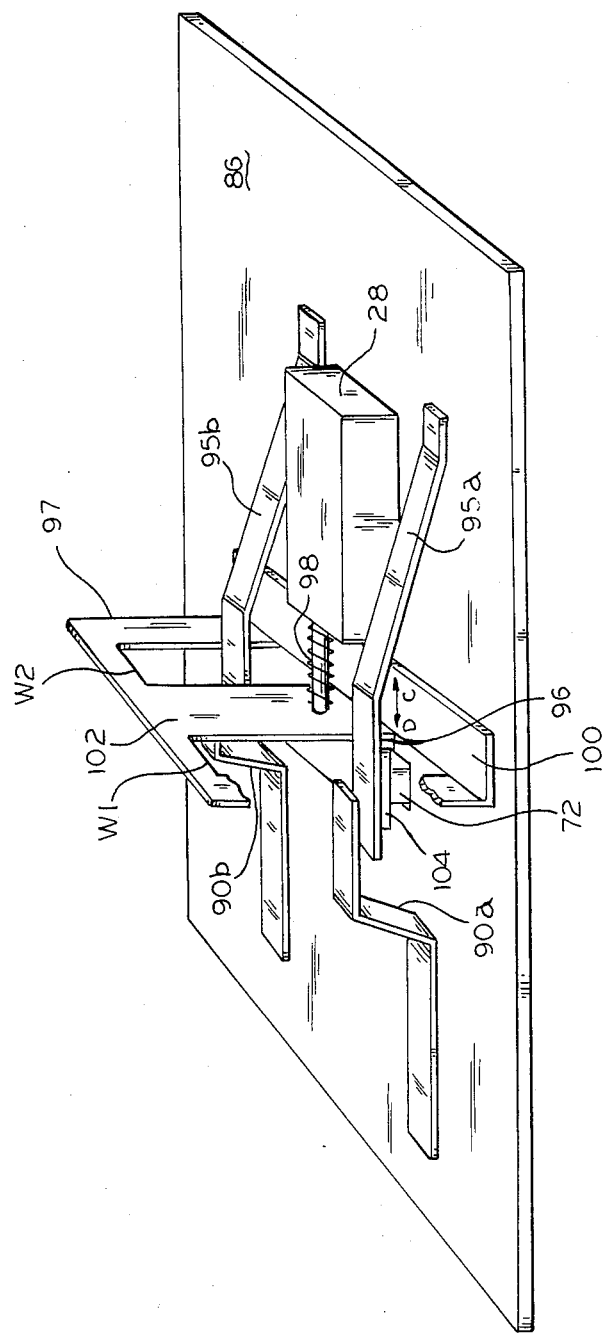
FIG. 4 shows a low cost way of manufacturing the device of FIG. 3.

A frame or chassis 86 is immobilized in the housing by a screw 88, or by being molded in place or molded in one piece (FIG. 4). FIG. 3 is a side view and FIG. 4 is a perspective view of substantially the structure. There are two springs 90a, 90b (FIG. 4) and two springs 95a, 95b. A vertical spring and guide 97 is integrally molded with or cemented on base plate. Two vertical windows W1, W2 are formed in the spring and guide 97 in order to protect the springs while enabling them to function properly. Depending from the top of the spring and guide 97 is a latch plate 96 controlled by an armature 98 on the solenoid 28.

In FIG. 3, the two sets of springs 90a, 90b and 95a, 95b are treated as if they were one. Dependent from chassis 86 is leaf spring 90 leading to a set of contacts 92, 94 through which the electrical power is transmitted to the appliance. Contacts 92, 94 represent both of the contacts 68, 70 in FIG. 2. If these contacts are opened, all power is removed from the appliance. The second contacts 92 is mounted on an end of leaf spring 95. The leaf springs 90, 95 bias the contacts 92, 94 to an open position unless they are positively held closed by a latch 96.

The solenoid winding at 28 is the same as the winding 28 that is shown in FIG. 2. Therefore, if either of the SCR's 40, 42 conducts, the solenoid 28 is energized to attract a plunger or armature 98. This armature is connected to the latch plate 96, having an end anchored at 100 to the chassis 86 and a hinge at point 102. When the armature 98 is pulled by an energization of solenoid, the latch plate 96 is withdrawn in direction C. This releases a hold down plate 104. The bias in spring 95 snaps it upwardly to open contacts 92, 94 and to elevate a reset button 72.

After solenoid 28 is deenergized, as by pulling terminals 82 of plug 80 from a wall outlet, armature 98 is released to return latch 96 under the urging of its spring bias in direction D, to the position shown in FIGS. 3, 4. The reset push button 72 may be pushed. The shapes of the latch 96 and hold down plate 104 cooperate to hold the contacts 92, 94 in a closed position.

The neon bulb 110 is an optional feature connected across the power line in order to indicate when power is applied to the appliance. The circuit to neon bulb 110, contacts 92, 94 and solenoid 28 is completed at spade terminals 112.

Figure 2A:
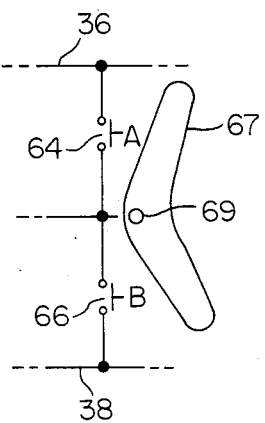
FIG. 2A shows an alternative embodiment wherein a mechanical rocker switch is provided to interlock two test switches so that they cannot operate simultaneously.

A pair of test buttons 114 are provided for momentarily closing the contacts 64, 66 (FIG. 2). Resistors 65, 65 are provided to prevent a short circuit if both test buttons A and B are pushed simultaneously. In the alternative a rocking switch 67 may be provided to rock on pivot 69. If rocker switch 67 is pushed on the top (as viewed in FIG. 2A), only the switch A is closed to test the circuit with respect a potential on wire 36, switch B being unoperated. If rocker switch 67 is pushed on the bottom, only switch B may be closed to test the circuit with respect to a potential on wire 38. Since it is mechanically impossible to simultaneously close both switches A and B, there is no way for a short circuit to be applied across the wires 36, 38.

Thus, by selectively operating one of the contacts 64, 66 (FIG. 2), a simulated immersion appears at either one of these test contacts and the solenoid 28 operates latch 96, thereby releasing hold down 104 and opening contacts 92, 94 to indicate operativeness of the circuit. Each one of the test buttons is operated individually to show that its side of the circuit is operating properly. This is true regardless of which side of the line is hot and which is at neutral potential.

While the invention is shown and described in connection with an appliance, it is equally applicable to provide a secondary protection for a house or building wiring, this supplementing the principal fuse or circuit breaker.

The advantages of the invention should now be obvious. The immersion detector cuts off the power regardless of whether the house is properly wired, whether plastic plumbing, a marbled top, etc. insulate the sink or tub from a plumbing and regardless of whether the power switch 26 is opened or closed. The circuit does not respond to transients such as the wild voltage spikes that may appear on a commerical power line and yet does respond fast enough to protect an individual.

Those who are skilled in the art will readily perceive how to modify the invention. Therefore, the appended claims are to be construed to cover all equivalent structures which fall within the true scope and spirit of the invention.

The claimed invention is:

1. An immersion detector comprising at least a pair of input terminals to which an electrical power source is to be applied, an appliance having a sensing potential point which may become energized if said appliance becomes immersed in a body of water, a power cord including at least a pair of wires, each of said wires extending from said terminals through a normally conducting switch to said appliance, sensing conductor means extending from said sensing potential point to a power cut off circuit, said power cut off circuit comprising a pair of electronic switch means; diode means for isolating said electronic switch means to provide a steering circuit so that the electronic switch means associated with a hot side of said two wires operates responsive to a potential on said sensing conductor means, each of said electronic switch means having a control electrode coupled to said sensing conductor means, means responsive to said potential point becoming energized for operating one of said electronic switch means via said sensing conductor means, and circuit breaking means responsive to said operating of said electronic switch means for making said normally conducting switches non-conducting in order to break said pair of wires.

2. The detector of claim 1 wherein said means for making said normally conducting switches non-conducting in order to break said pair of wires comprise a solenoid coil for opening a spring biased latch means, each said normally conducting switch being a set of spring biased mechanical contacts in series with each wire in said pair of wires, said latch means normally holding said mechanical contacts closed against the urging of said spring bias for said contacts, whereby an operation of said solenoid withdraws said latch and said spring biased mechanical contacts fly open.

3. The detector of claim 2 further comprising manual means for returning said mechanical contacts to their closed and latched condition.

4. An immersion detector comprising at least a pair of input terminals to which an electrical power source is to be applied, an appliance having a sensing potential point which may become energized if said appliance becomes immersed in a body of water, a power cord including at least a pair of wires extending from said terminals to said appliance, sensing conductor means extending from said sensing potential point to a power cut off circuit, said power cut off circuit comprising a pair of electronic switch means; each of said electronic switch means being coupled between said sensing conductor means and an individually associated one of said pair of wires in said power cord, diode means for isolating said electronic switch means to provide a steering circuit so that the electronic switch means associated with a hot side of said two wires operates responsive to a potential on said sensing conductor means, whereby said detector operates regardless of which of said wires is hot and which is at neutral potential, means responsive to said potential point becoming energized to operate one of said electronic switch means via said sensing conductor means, means responsive to said operation of said switch for opening said pair of wires, said means for opening said power cord comprising a solenoid coil coupled between said pair of wires via said diode means, said diode means steering said hot side potential through said coil and into the operated one of said electronic switch means, and contacts controlled by said coil for opening each of said wires.

5. The detector of claim 4 wherein said contacts are spring biased to fly apart when said coil is energized, said contacts remaining open until manually reset.

6. An immersion detector comprising an appliance which is to be powered via a two wire line, either one of said two wires being a hot wire and the other being a neutral wire at any given time, said detector operating responsive to an immersion of said appliance in a liquid with a resulting current through said liquid for energizing a part of said appliance from any source of power potential to any ground or neutral potential which may be present in said liquid, means comprising a single sensing conductor coupled to said part to be energized responsive to said current through said liquid to said part, and means comprising a pair of electronic switches coupled to be individually associated with each of said two wires and controlled via said single sensing conductor for opening said two wire line to remove all power from said appliance in response to said resulting current in said liquid applied through said single sensing conductor, one of said electronic switches being individually associated with each of said two wires, and diode means coupled to isolate said two electronic switches from each other so that only the electronic switch which is individually associated with said hot wire is operated when said part is energized, whereby either of said two wires may be either hot or neutral, each of said electronic switches is an SCR having at least a gate electrode, said single sensing conductor connecting said part to said gate electrode on each of said SCR's, the connections from said sensing conductor to each gate electrode being completed via diodes which are poled to electrically isolate the two gates from each other, said sensing conductor applying a control signal to said gate electrode by carrying said resulting current thereto.

7. An immersion detector for an appliance which is powered via a two wire line, either one of said two wires being hot and the other being neutral at any given time, said detector comprising means responsive to an immersion of said appliance in a liquid with a resulting current through said liquid for energizing a part of said appliance from any source of power potential to any ground or neutral potential which may be present in said liquid, means comprising a single sensing conductor coupled to said part to be energized responsive to said current through said liquid to said part; two electronic SCR switches each having anode, cathode and gate electrodes, a corresponding one of said SCR switches being individually associated with each of said two wires, diode means coupled to isolate said two SCR switches from each other so that only the switch which is individually associated with said hot wire is operated when said part is energized, solenoid coil, the anode and cathode electrodes of each of said SCR's being connected from one of said two wires through said solenoid coil and an isolating diode to the other of said two wires with the diode and SCR associated with one of said wires being oppositely poled relative to the diode and SCR associated with the other of said wires, said single sensing conductor connecting said part to the gate electrode on each of said SCR's, the connections from said sensing conductor to each gate being completed via an individually associated diode which is poled to electrically isolate the two gates from each other, and means for opening said two wire line to remove all power from said appliance in response to current in said liquid.

8. The detector of claim 7 further comprising voltage limiting means coupled across said two wires to limit the voltage which may appear across the SCR's.

9. The detector of claim 7 further comprising test means for selectively connecting either of said two wires to said sensing conductor.

10. An immersion detection circuit comprising an appliance with a sensing circuit which may become energized if said appliance is immersed in an electrically conductive liquid, said sensing circuit comprising a pair of terminals for making a connection to a source of A.C. power; a power cord having at least two wires extending from said pair of terminals through circuit breaking contacts to said appliance; a solenoid coil for selectively opening said circuit breaking contacts; said solenoid coil being connected between said wires of said power cord with two oppositely poled diodes interposed between said coil and said two wires to form two series circuits which are conductive in each of two opposing directions; two SCR's, each of said series circuits comprising a first wire, a first individually associated one of said diodes poled in one direction, the coil, an individually associated one of said SCR's poled in said one direction, and the second wire, the diodes and SCR's in said two series circuits being poled in opposite directions; each of said SCR's being coupled in parallel with and oppositely poled with respect to a corresponding one of said diodes; each of said SCR's having a gate electrode connected through an individually associated diode to said sensing circuit, said individually associated diodes being poled to apply a gating pulse to the gate electrode of the corresponding one of said SCR's when said sensing circuit becomes energized.

11. The detector of claim 10 further comprising means for limiting the voltage level of said gating pulse to a minimum potential for reliably switching on said SCR.

12. The detector of claim 10 further comprising capacitor means connected from a gate of each SCR to an associated one of said lines for by-passing transient voltage spikes appearing at said gate.

13. The detector of claim 10 wherein said circuit breaking contacts are held closed against a spring tension, and means responsive to an energization of said coil for releasing said contacts whereby said spring tension snaps them to an open condition.

14. An immersion detector comprising at least a pair of input terminals to which an electrical power source is to be applied, an appliance having a sensing potential point which may become energized if said appliance becomes immersed in a body of water, a power cord including at least a pair of power carrying wires extending from said terminals to said appliance, sensing conductor means extending from said sensing potential point to a power cut off circuit, said power cut off circuit comprising a pair of electronic switch means, each of said electronic switch means being coupled between said sensing conductor means and an individually associated one of said pair of power carrying wires in said power cord whereby said detector operates regardless of which of said power carrying wires is hot and which is at a neutral potential, means responsive to said potential point becoming energized for operating one of said electronic switches via said sensing conductor means, means responsive to said operation of said switch for opening said pair of wires, pair of test switch means respectively coupled between said sensing conductor means and individually associated ones of said pair of power carrying wires for simulating an immersion of said appliance in said body of water, and means for precluding simultaneous operation of both of said pair of test switch means.

15. The immersion detector of claim 14 wherein said precluding means is a rocker switch that is mechanically incapable of simultaneously closing both of said pair of test switch means.

16. An immersion detector comprising an appliance which is to be powered via a two wire line, either one of said two wires being hot and the other being neutral at any given time, said detector comprising means responsive to an immersion of said appliance in a liquid with a resulting current through said liquid for energizing a part of said appliance from any source of power potential to any ground or neutral potential which may be present in said liquid, means comprising a single sensing conductor coupled to said part to be energized responsive to said current through said liquid to said part, means for opening said two wire line to remove all power from said appliance in response to current in said liquid, a pair of testing switch means coupled between individually associated wires of said two wire line and said single sensing conductors, whereby an operation of either one of said switch means simulates an immersion of said appliance, and mechanical means for interlocking said testing switch means to preclude their simultaneous operation.

17. An immersion detector comprising at least a pair of input terminals to which an electrical power source is to be applied, an appliance having a sensing potential point which may become energized if said appliance becomes immersed in a body of water, a power cord including at least a pair of wires extending from said terminals to said appliance, sensing conductor means extending from said sensing potential point to a power cut off circuit, said power cut off circuit comprising a pair of electronic switch means, each of said electronic switch means being coupled between said sensing conductor means and an individually associated one of said pair of wires in said power cord whereby said detector operates regardless of which of said wires is hot and which is at neutral potential, means responsive to said potential point becoming energized for operating one of said electronic switch means via said sensing conductor means, means responsive to said operating of said switch means for opening said pair of wires, and a pair of test switches in series with a resistance respectively coupled between said sensing conductor means and individually associated ones of said pair of wires for simulating an immersion of said appliance in said body of water, said resistance being high enough to preclude a short circuit between said pair of wires if both of said test switches are operated simultaneously.

* * * * *